(12) United States Patent
Weidlich

(10) Patent No.: US 6,357,976 B1
(45) Date of Patent: Mar. 19, 2002

(54) METHOD FOR POSITIONING ENGRAVING ORGANS

(75) Inventor: Gottfried Ernst-Rudolf Weidlich, Kiel (DE)

(73) Assignee: Heidelberger Druckmaschineen AG, Heidelberg (DE)

( * ) Notice: Subject to any disclaimer, the term of this patent is extended or adjusted under 35 U.S.C. 154(b) by 0 days.

(21) Appl. No.: 09/485,199

(22) PCT Filed: Jul. 11, 1998

(86) PCT No.: PCT/DE98/01933

§ 371 Date: Apr. 18, 2000

§ 102(e) Date: Apr. 18, 2000

(87) PCT Pub. No.: WO99/07554

PCT Pub. Date: Feb. 18, 1999

(30) Foreign Application Priority Data

Aug. 8, 1997 (DE) .......................................... 197 34 411

(51) Int. Cl.⁷ ................................................. B41F 1/07
(52) U.S. Cl. ......................... 409/131; 101/32; 358/299; 409/108
(58) Field of Search ............................... 409/79, 80, 94, 409/96, 107, 108, 112, 131, 132, 147, 148, 149; 101/32, 485; 358/299, 302

(56) References Cited

U.S. PATENT DOCUMENTS

| 4,013,829 A | * | 3/1977 | Baar et al. ................... 358/299 |
| 5,424,845 A | * | 6/1995 | Holowko et al. ............ 358/299 |
| 5,438,422 A | | 8/1995 | Holowko et al. |
| 5,492,057 A | | 2/1996 | Bornhors, Jr. et al. |
| 5,947,020 A | * | 9/1999 | Bornhorst, Jr. et al. ....... 101/32 |
| 6,283,019 B1 | * | 9/2001 | Dolves ........................ 101/32 |

FOREIGN PATENT DOCUMENTS

| EP | 0 520 396 | 12/1992 |
| WO | WO 96/33869 | 10/1996 |

OTHER PUBLICATIONS

Patent Abstracts of Japan–Publication No. 07089036 A –Apr. 4, 1995.

* cited by examiner

*Primary Examiner*—Daniel W. Howell
(74) *Attorney, Agent, or Firm*—Schiff Hardin & Waite

(57) ABSTRACT

In a method for positioning engraving elements in an electronic engraving machine for a rotogravure printing cylinder engraving at least two adjacent lying engraving areas of selected widths by engraving with an engraving element respectively assigned thereto, axial reference positions are selected for the engraving elements whose axial distances to each other correspond to the selected widths of the engraving areas that are to be engraved. An electronic position measuring system formed essentially of a video camera and an image evaluation unit is successively placed on the axial reference positions. At each reference position, the axial divergence of the tip of the stylus pertaining to the appropriate engraving element or the divergence of at least one cup which is test engraved by the engraving element from the reference position is determined using the position measuring system. The engraving elements are then automatically shifted according to the chosen divergences and placed exactly on the reference positions.

21 Claims, 1 Drawing Sheet

METHOD FOR POSITIONING ENGRAVING ORGANS

BACKGROUND OF THE INVENTION

The invention is in the field of electronic reproduction technology and is directed to a method for positioning engraving elements in an electronic engraving machine for engraving printing cylinders for rotogravure, whereby at least two engraving lanes of predetermined lane widths lying next to one another in an axial direction on the printing cylinder are engraved with a respectively allocated engraving element, and is also directed to an electronic engraving machine and a position measuring unit for the implementation of the method.

When engraving printing cylinders in an electronic engraving machine, an engraving element that comprises an engraving stylus as cutting tool moves along a rotating printing cylinder in the axial direction either continuously or in steps. The engraving stylus controlled by an engraving control signal cuts a sequence of depressions, referred to below as cups, arranged in an engraving grid into the generated surface of the printing cylinder. The engraving control signal is formed from the superimposition of an engraving signal representing the gradations between "black" and "white" with a periodic raster signal. Whereas the periodic raster signal effects a vibrating lifting motion of the engraving stylus, the engraving signal controls the depths of the cups engraved into the generated surface of the printing cylinder in conformity with the gradations to be reproduced.

For magazine printing, a plurality of stripe-shaped cylinder regions, called engraving lanes, that lie axially next to one another on a printing cylinder must be simultaneously engraved with a respective engraving element. For example, the various printed pages of a print job are engraved in the individual engraving lanes. The engraving elements allocated to the individual engraving lanes are mounted on an engraving carriage that moves along the printing cylinder in axial direction during the engraving.

A precondition for a good reproduction quality is registration-precise adherence to the lane widths of the individual engraving lanes in axial direction of the printing cylinder. In order to achieve a registration-exact engraving of the engraving lanes, the distances between the tips of the engraving styli of the individual engraving elements in the traditional method must be set in the axial direction of the printing cylinder by axial displacement of the engraving elements on the engraving carriage, being set with high precision to the required lane widths, and the engraving carriage with the engraving elements must then be displaced such relative to the printing cylinder such that the engraving stylus tips are positioned to the respective, axial start of engraving positions of the engraving lanes.

The traditional positioning of the engraving stylus tips of the engraving elements onto the lane widths essentially occurs manually by an operator, in that the latter initially roughly sets the axial spacings of the engraving elements from one another corresponding to the lane widths, and the engraving stylus tips of the engraving elements are then finely positioned upon visual observation of the engraving stylus tips with the assistance of a specific microscope unit (stylus allocation rule) and spindle drives actuated by hand.

This manual procedure is time-consuming, particularly when a great number of engraving lanes are to be engraved and, thus, a great number of engraving elements must be positioned. Moreover, the adjustment precision is essentially dependent on the care of the operator.

WO Published application 95/31332 already discloses a system for the automatic axial positioning of a plurality of engraving elements when engraving printing cylinders, with the assistance of motor drives for the individual engraving elements arranged on an engraving carriage and via a sensor monitoring.

SUMMARY OF THE INVENTION

An object of the present invention is to improve a method for positioning engraving elements in an electronic engraving machine for engraving printing cylinders for rotogravure as well as an electronic engraving machine for implementation of the method such that the adjustment of the axial spacings of the engraving elements relative to one another occurs automatically in a short time with high precision.

According to the method and apparatus of the invention for positioning engraving elements in an electronic engraving machine for engraving a printing cylinder for rotogravure, where at least two engraving lanes of predetermined lane widths lying next to one another in an axial direction of the printing cylinder are engraved in the form of cups with a respectively allocated engraving element, the engraving elements being positioned axially relative to the engraving cylinder before the engraving, with the engraving elements implementing an axial feed motion along the printing cylinder during engraving. Axial reference positions are predetermined for the engraving elements, axial spacings thereof from one another corresponding to the predetermined lane widths of the respective engraving lane. An electronic position measuring system is successfully positioned to the axial reference positions. An axial deviation of a reference point of the allocated engraving element from the reference position is identified with the position measuring system in every reference position. The engraving elements with their reference points are axially displaced by the identified deviations onto the corresponding reference positions.

In a position measuring system for an engraving machine for engraving cups on a printing cylinder with engraving elements, a video camera is mounted on a measuring carriage for registering video images of engraving stylus tips of the engraving elements or of cups engraved as trials with the engraving elements as axial positions of the engraving elements roughly shifted onto predetermined reference positions. The measuring carriage is displaceable in an axial direction of a printing cylinder and positionable to the predetermined reference positions for the engraving elements. An image evaluation unit for determining axial deviations of the actual positions of the engraving elements from the reference positions by interpreting the registered video images is provided.

The invention is explained in greater detail below with reference to the drawing figure.

BRIEF DESCRIPTION OF THE DRAWING

The drawing FIG. 1 shows a schematic block circuit diagram of an engraving machine with a printing cylinder that is rotationally driven by a cylinder drive. The engraving machine is, for example, a HelioKlischograph® of Hell Gravure Systems GmbH, Kiel, Del.

Figure 1:
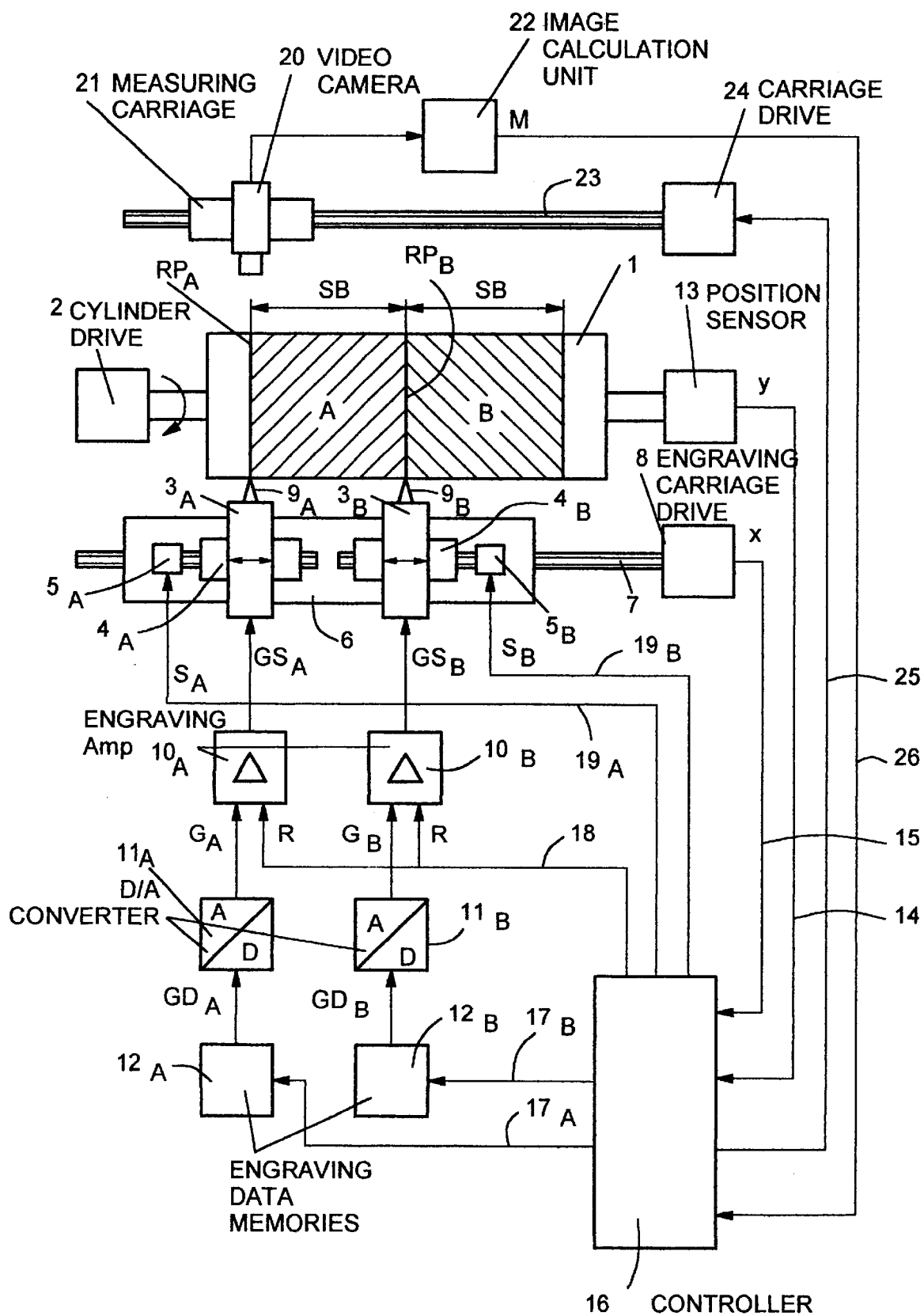
FIG. 1 is a drawing showing a schematic block circuit diagram of an engraving machine operating according to the method of the invention.

A number of engraving lanes lying next to one another in the axial direction of the engraving cylinder two engraving lanes with the same axial lane widths are to be engraved on the printing cylinder with a respectively allocated engraving element. The engraving elements are designed as electromagnetic engraving elements having engraving styli as cutting tools in the exemplary embodiment.

The engraving elements are mounted on individual engraving supports that are displaceable relative to one another on an engraving carriage in the axial direction of the printing cylinder with suitable motor drives and can be locked on the engraving carriage in the positions of the engraving elements that are set. The motor drives can, for example, be fashioned as chain, gear wheel, tooth belt or as spindle drives, as in the exemplary embodiment. Alternatively, the engraving supports can also be displaced by manually actuated, precision drives.

For axial positioning of the engraving elements relative to the printing cylinder and for feeding the engraving elements during the engraving, the engraving carriage is moved in the axial direction of the printing cylinder by an engraving carriage drive via a spindle.

The spindle drives for the engraving supports and the engraving carriage drive for the engraving carriage are designed as precision drives with stepping motors. Each stepping motor is driven by a motor clock sequence, where one clock respectively corresponds to a traversed path increment of the engraving support or of the engraving carriage. By counting the clocks of the motor clock sequence, the respective axial position of the engraving support of the engraving carriage can be identified, or the engraving support or the engraving carriage can be displaced into a defined, axial position by counting back a predetermined number of clocks. Such positioning drives are known and are commercially obtainable.

Each engraving element cuts a sequence of cups arranged in an engraving raster into the generated surface of the rotating printing cylinder engraving line by engraving line with its engraving stylus, while the engraving carriage with the engraving elements is moved along the printing cylinder in the feed direction.

The engraving of the cups occurs on individual engraving lines proceeding circularly in circumferential direction around the printing cylinder, whereby the engraving carriage respectively implements an axial feed step to the next engraving line after engraving the cups of one engraving line. Such an engraving process is disclosed, for example, in U.S. Pat. No. 4,013,829.

Alternatively, the engraving of the cups can occur in an engraving line proceeding helically around the printing cylinder, whereby the engraving carriage then implements a continuous feed motion during the engraving.

The engraving styli of the engraving elements are controlled by engraving control signals. The engraving control signals are formed in engraving amplifiers from the superimposition of a periodic raster signal with engraving signal values that represent the gradations of the cups to be engraved between "black" and "white". Whereas the periodic raster signal effects a vibrating lifting motion of the engraving styli for generating the engraving raster, the engraving signal values define the respective penetration depth of the engraving styli into the generated surface of the printing cylinder in conformity with the gradations to be engraved.

The frequency of the raster signal, the circumferential speed of the printing cylinder and the axial feed step width of the engraving carriage determine the geometry of the engraving raster with respect to screen angle and raster width.

The analog engraving signal values are acquired in A/D converters from engraving data that are stored in engraving data memories and are read out therefrom engraving line by engraving line and supplied to the A/D converters. An engraving datum of at least one byte which, among other things, contains the gradation between "black" and "white" to be engraved as engraving information is thereby allocated to each engraving location for a cup on the engraving cylinder.

Each engraving location in the engraving raster is defined by location coordinates of an xy-coordinate system that is oriented in circumferential direction and in the axial direction. The engraving carriage drive generates the location coordinates of the engraving locations in the feed direction, and a position sensor mechanically coupled to the engraving cylinder generates the corresponding location coordinates of the engraving locations in circumferential direction. The location coordinates are supplied to a controller via lines.

The controller controls the engraving data memories upon read out of the engraving data and also controls the entire executive sequence in the engraving in the engraving machine.

The addresses of the engraving data memories are calculated in the controller from the location coordinates. The controller also generates read clock sequences with which the engraving data are read from the engraving data memories. Addresses, read clock sequences and corresponding control instructions are supplied to the engraving data memories via lines.

The controller also generates the periodic raster signal that proceeds to the engraving amplifiers via a line.

Before engraving the engraving lanes the axial spacings of the engraving stylus tips of the engraving elements must be set precisely to the predetermined lane widths of the engraving lanes, this being described in greater detail below.

For setting the axial spacings between the engraving stylus tips, reference positions are initially defined, their axial distances from one another corresponding to the predetermined lane widths. The position of the reference positions with respect to the printing cylinder is basically arbitrary. However, it proves expedient when the reference positions coincide with the axial start positions for the engraving of the engraving lanes on the printing cylinder, since, in this case, an additional positioning of the engraving carriage to the start positions is superfluous after the spacing adjustment of the engraving stylus tips.

The position of the engraving stylus tips onto the reference positions in the illustrated exemplary embodiment occurs by automatic axial displacement of the individual engraving supports on the engraving carriage with the assistance of the spindle drives to the reference positions. For that purpose, the controller generates corresponding control signals that are supplied to the spindle drives via lines.

For controlling and monitoring the axial displacement of the engraving stylus tips of the engraving elements onto the reference positions the engraving machine comprises a position measuring units system that, in the exemplary embodiment, is essentially composed of a measuring carriage displaceable in the axial direction of the printing cylinder with a video camera and of an image evaluation unit for interpreting the video images registered by the video camera. The measuring carriage, for example, is moved with a spindle by a measuring carriage drive that is likewise designed as a precision drive with a stepping motor.

By prescribing the x-location coordinate of the reference position of one of the engraving elements, a measuring mark mixed into the video image generated by the video camera is positioned exactly to the reference position with the measuring carriage drive. The predetermined x-location coordinate of the reference position and corresponding control commands are communicated from the controller to the measuring carriage drive via a line.

After the measuring mark mixed into the video image is positioned to one of the two reference positions, the axial displacement of the corresponding engraving element is started proceeding from a start position by a control signal to the appertaining spindle drive for the engraving support, said start position having been assumed by the engraving support as a result of a preceding manual or motor-driven rough adjustment in the coverage area of the video camera.

The control and monitoring of the axial displacement of the corresponding engraving element occurs dependent on the result of the electronic interpretation in the image evaluation unit of the video image registered with the video camera.

In the electronic interpretation of the video image, the axial deviation of the actual position of a reference point of the corresponding engraving element from the mixed-in measuring mark or, respectively, from the corresponding reference position in or opposite the feed direction is identified, is communicated as measured signal to the controller via a line and is converted therein into a corresponding control signal for the spindle drives.

The image interpretation and control of the axial displacement of the engraving element can thereby occurs in various ways. For example, the axial deviation between the start position of the reference point of the engraving element assumed in the rough positioning—as an actual position—and the measuring mark as a rated position can be determined only once in the video image, and can be stored and converted into an equivalent path of the engraving support. Alternatively thereto, the axial deviation between actual position and rated position can be continuously identified in the video image during the axial displacement of the engraving element and can be communicated to the controller as a measured signal until the rated position has been reached.

Fundamentally, the reference point of an engraving element for the control of the axial displacement can lie in a plane proceeding perpendicularly to the axial direction of the printing cylinder and through the engraving stylus tip of the engraving element. In an expedient way, the engraving stylus tip itself or at least one cup that was engraved as a trial on the printing cylinder with the corresponding engraving element is selected as a reference point of an engraving element.

When the engraving supports with the engraving elements are not axially positioned by a motor drive, as shown in the figure, but by manually actuated precision drives, an acoustic or optical signal can also be generated in the controller, this signaling an operator the exact positioning. An auxiliary unit (not shown), for example in the form of a light barrier aligned perpendicular to the axial direction, can be provided given manual, rough positioning of the engraving elements, this providing the operator with a different optical or acoustic signal when the engraving stylus tip, as a reference point of an engraving element, is located within the allowable range of measurement of the position measuring system.

When the engraving stylus tips of the engraving elements are employed as reference points for the axial displacement of the engraving stylus tips, the exact positioning of the engraving stylus tips to the individual reference positions expediently occurs before the printing cylinder is introduced into the engraving machine. In every reference position, the video camera is thereby shifted on the measuring carriage perpendicular to the axial direction such that it supplies a sharp video image of the respective engraving stylus tip as a reference point.

When, in contrast, the cups engraved as trials with the engraving elements are employed as reference points for the axial displacement of the engraving stylus tips, the engraving elements are roughly set to their reference positions after insertion of the printing cylinder, and at least one cup per engraving element is then engraved on the printing cylinder. After engraving these cups, the video camera is successively moved to the individual reference positions. A video image of the cup engraved as a trial is then registered in every reference position as a reference point and is correspondingly interpreted. As described above, the rough positioning of the engraving elements can occurs with the position measuring system and with the auxiliary unit.

The invention is not limited to the illustrated exemplary embodiments.

Alternatively to an electromagnetic engraving element having an engraving stylus as cutting tool, an electron beam or laser beam engraving element can also be employed. In this case, the axis of the processing beam can serve as reference point.

Other embodiments are also conceivable for the position measuring system. For example, a commercially obtainable length measuring system MR-MAGNESCALE® of Sony Magnescale Incorporated, Tokyo, JP, can also be employed for setting the measuring carriage to the individual reference positions. In this case, a magnetically readable scale is arranged in the axial direction, this being read and interpreted by a read head located at the measuring carriage.

Advantageously, the position measuring unit can also be employed for ongoing monitoring of the actual positions of the engraving stylus tips of the engraving elements when engraving the engraving lanes.

The inventive method, in particular, is suitable for the exact positioning of a great number of engraving elements for engraving engraving lanes, since the preparatory phase for the engraving is significantly shortened and a high engraving precision is achieved.

Although various minor changes and modifications might be proposed by those skilled in the art, it will be understood that my wish is to include within the claims of the patent warranted hereon all such changes and modifications as reasonably come within my contribution to the art.

I claim:

1. A method for positioning engraving elements in an electronic engraving machine for engraving a printing cylinder for rotogravure, where at least two engraving lanes of predetermined lane widths lying next to one another in an axial direction of the printing cylinder are engraved in the form of cups with a respectively allocated engraving element, the engraving elements being positioned axially relative to the engraving cylinder before the engraving, comprising the steps of:

with the engraving elements, implementing an axial feed motion along the printing cylinder during engraving;

predetermining axial reference positions for the engraving elements, axial spacings thereof from one another corresponding to the predetermined lane widths of the respective engraving lane;

successively positioning an electronic position measuring system to the axial reference positions;

identifying an axial deviation of a reference point of the allocated engraving element from the reference position with the position measuring system in every reference position; and axially displacing the engraving elements with their reference points by the identified deviations onto the corresponding reference positions.

2. The method according to claim 1 wherein the engraving elements are axially displaced until the position measuring system has respectively determined a positional coincidence of the reference point with the corresponding reference position.

3. The method according to claim 1 wherein the engraving elements are arranged displaceable and lockable on an engraving carriage;

the engraving elements are locked at the engraving carriage after being shifted onto the corresponding reference positions; and the engraving carriage together with the locked engraving elements implements the feed motion along the printing cylinder when engraving the respective engraving lanes.

4. The method according to claim 1 wherein the reference point of an engraving element lies in a plane proceeding perpendicular to the axis of the printing cylinder and through the element of the engraving element producing the cups.

5. The method according to claim 1 wherein the reference point of the engraving element is a tip of the engraving stylus of an electromagnetic engraving element.

6. The method according to claim 1 wherein the reference point of an engraving element is at least one cup engraved as a trial on the printing cylinder with the engraving element.

7. The method according to claim 1 wherein the position measuring system is composed of a video camera for registering a video image of the reference point of an engraving element and of an image evaluation unit for determining the deviation of the reference point from the allocated reference position by electronic interpretation of the video image.

8. The method according to claim 7 wherein the video camera is arranged on a measuring carriage that can be displaced and positioned in the axial direction of the printing cylinder.

9. The method according to claim 8 wherein the video camera is automatically positioned to the reference positions with a drive for the measuring carriage.

10. The method according to claim 1 wherein the reference positions coincide with engraving start positions of the engraving lanes on the printing cylinder.

11. The method according to claim 1 wherein the engraving carriage is displaced before the engraving such that the reference positions of the engraving elements coincide with engraving start positions of the engraving lanes of the printing cylinder.

12. The method according to claim 1 wherein each engraving element on the engraving carriage is automatically displaced onto the allocated reference position with a displacement unit.

13. The method according to claim 12 wherein the displacement unit is controlled dependent on the deviations identified with the position measuring system.

14. The method according to claim 1 wherein the engraving elements are roughly positioned to the reference positions before determination of the deviations.

15. A method for positioning engraving elements in an electronic engraving machine for engraving a printing cylinder for rotogravure, where at least two engraving lanes are engraved in the form of cups with a respectively allocated engraving element, the engraving elements being positioned axially relative to the engraving cylinder before the engraving, comprising the steps of:

with the engraving elements, implementing an axial feed motion along the printing cylinder during engraving;

predetermining axial reference positions for the engraving elements, axial spacings thereof from one another corresponding to lane widths of the respective engraving lane;

successively positioning an electronic position measuring system to the axial reference positions;

identifying an axial deviation of a reference point of the allocated engraving element from the reference position with the position measuring system; and axially displacing the engraving elements with their reference points by the identified deviations onto the corresponding reference positions.

16. An engraving machine for engraving at least two engraving lanes of predetermined lane widths lying next to one another in an axial direction of a printing cylinder with a respectively allocated engraving element, comprising:

a rotationally seated printing cylinder turned by a first drive;

an engraving carriage moveable in the axial direction of the printing cylinder with a second drive;

engraving elements for engraving the engraving lanes, these being arranged displaceable and lockable on the engraving carriage;

a position measuring system displaceable in the axial direction of the printing cylinder and positionable to predetermined, axial reference positions for the engraving elements for determining exact positioning of the engraving elements to their reference positions; and a displacement unit for each engraving element on the engraving carriage controlled by the position measuring system for automatic displacement of the engraving elements to their reference positions.

17. The engraving machine according to claim 16 wherein the position measuring system has the following components:

a video camera mounted on a measuring carriage for registering video images of the reference points of the engraving elements; and an image evaluation unit for determining the axial deviations of the reference points from the predetermined reference positions by interpreting the video images registered with the video camera.

18. The engraving machine according to claim 16 wherein the measuring carriage together with the video camera is displaceable in the axial direction of the printing cylinder.

19. The engraving machine according to claim 16 wherein the measuring carriage together with the video camera is automatically positioned with a drive to the predetermined, axial reference positions.

20. An engraving machine for engraving at least two engraving lanes with a respectively allocated engraving element, comprising:

a rotationally seated printing cylinder turned by a first drive;

an engraving carriage moveable in an axial direction of the printing cylinder with a second drive;

engraving elements for engraving the engraving lanes, these being arranged displaceable and lockable on the engraving carriage;

a position measuring system displaceable in the axial direction of the printing cylinder and positionable to predetermined, axial reference positions for the engraving elements for determining exact positioning of the engraving elements to their reference positions; and a displacement unit for each engraving element on the engraving carriage controlled by the position measuring system for automatic displacement of the engraving elements to their reference positions.

21. A position measuring system for an engraving machine for engraving cups on a printing cylinder with engraving elements, comprising:

a video camera mounted on a measuring carriage for registering video images of engraving stylus tips of the engraving elements or of cups engraved as trials with the engraving elements as actual axial positions of the engraving elements roughly shifted onto predetermined reference positions;

the measuring carriage being displaceable in an axial direction of a printing cylinder and positionable to the predetermined reference positions for the engraving elements; and an image evaluation unit for determining axial deviations of the actual positions of the engraving elements from the reference positions by interpreting the registered video images.

\* \* \* \* \*